United States Patent [19]
Shiotsu et al.

[11] Patent Number: 6,033,230
[45] Date of Patent: Mar. 7, 2000

[54] PLANETARIUM

[75] Inventors: Nozomu Shiotsu; Rie Matsubara, both of Toyokawa, Japan

[73] Assignee: Minolta Co., Ltd., Osaka, Japan

[21] Appl. No.: 08/783,427

[22] Filed: Jan. 16, 1997

Related U.S. Application Data

[63] Continuation of application No. 08/358,821, Dec. 19, 1994, abandoned.

[30] Foreign Application Priority Data

Dec. 21, 1993 [JP] Japan .................................. H5-322561

[51] Int. Cl.⁷ ..................................................... G09G 3/00
[52] U.S. Cl. ........................................... 434/286; 434/284
[58] Field of Search ............................ 434/276, 284–293

[56] References Cited

U.S. PATENT DOCUMENTS

| | | |
|---|---|---|
| 3,574,955 | 4/1971 | Skolnick . |
| 4,639,224 | 1/1987 | Maejima et al. .......................... 434/286 |
| 5,311,203 | 5/1994 | Norton ..................................... 434/289 |

*Primary Examiner*—Glenn E. Richmon
*Attorney, Agent, or Firm*—Sidley & Austin

[57] ABSTRACT

A planetarium of the present invention has a plurality of projectors for projecting astronomical bodies and the like, input device and the like for entering data relating to the attitude of said projector, controller for controlling the attitude of said projector in accordance with said data, and memory device. The memory device stores variety information relating to planets, constellations, astronomical phenomena, and so one. When the attitude of projectors is entered, suitable information from among the information stored in the memory device is selected and displayed on a display device.

20 Claims, 7 Drawing Sheets

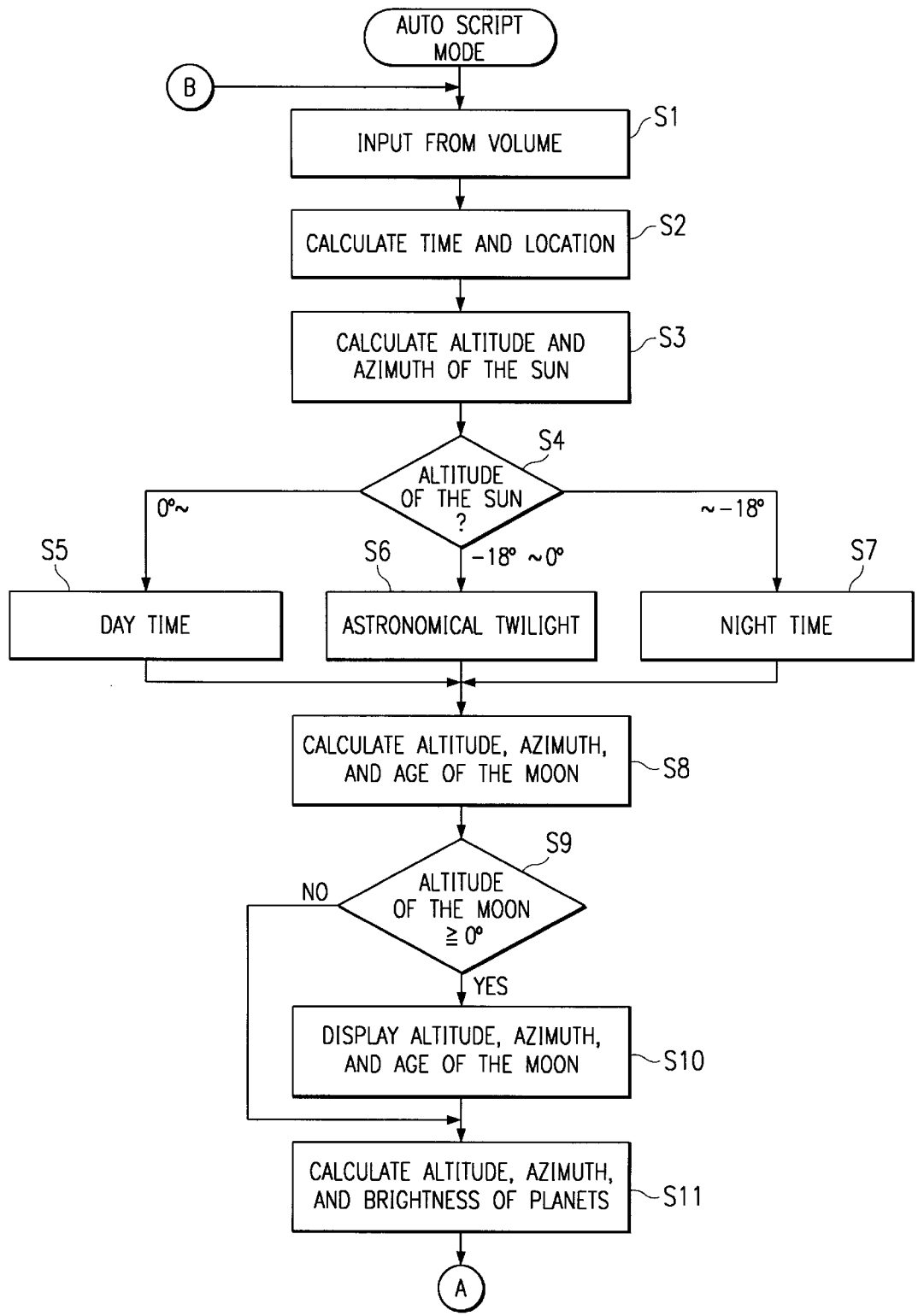

FIG. 7

| | | Constellations | | 34 — Return |
|---|---|---|---|---|
| Andromeda | Aquarius | Aquila | Ara | Aries |
| Auriga | Bootes | Camelopardails | Cancer | Canis major |
| Canis minor | Capriconus | Cassiopea | Centaurus | Cepheus |
| Cetus | Chamaeleon | Circinus | Columba | Coma Berenices |
| Corona Borealis | Corvus | Crater | Crux | Cygnus |
| Delphinus | Dorado | Draco | Equuleus | Eridanus |
| Fornax | Gemini | Grus | Hercules | Horologium |
| Hydra | Hydrus | Lacerta | Leo minor | Leo |
| Lepus | Libra | Lupis | Lyla | Lynx |
| Microscopium | Musca | Norma | Orion | Pavo |
| Pegasus | Perseus | Pictor | Pisces | Puppis |
| Pyxis | Reticulum | Sagitta | Sagittarius | Scopius |
| Scutum | Serpens | Taurus | Triangulum | Ursa major |
| Ursa minor | Vela | Virgo | Volans | Vulpecula |

| Virgo | Navigation |

Current Position:   below the horizon

Guidance:   20:30   rising
            2:07   meridian passage
            8:00   setting rising in eastern sky
      1 hour and 40 minutes later.

Spica 35          32   Dictionary   33
Return      Key Word   Today's Phenomena

14

PLANETARIUM

CROSS REFERENCE TO RELATED APPLICATION

This is a continuation of U.S. patent application Ser. No. 08/358,821 filed Dec. 19, 1994.

BACKGROUND OF THE INVENTION

1. Field of the Invention

The present invention relates to a planetarium.

2. Description of the Related Art

One of the most important items in programs projected in planetariums is the star field representation for the current evening. This star field projection describes the constellations, first magnitude stars, and astronomical phenomena of the current month as viewed from the location of the planetarium facility. The real star field migrates and changes slightly each evening. Normally, astronomical phenomena can only be viewed for a particular day or very short period. Therefore, it is desirable that the content of the star field representation for the current evening is changed each day.

Changing the program contents each day places an extreme burden on the person in charge of the planetarium. Typically, the persons creating the program must be well versed in the various types of astronomical information and knowledge in order to prepare programs of timely content. Further, when questions are posed by the audience during the presentation by the planetarium commentator, the commentator must have a profound knowledge of astronomy in order to suitably answer the questions from the audience. Conventionally, planetariums lacking program creators and commentators who possess profound knowledge of astronomy are disadvantaged inasmuch as adequate information cannot be provided to the audience.

SUMMARY OF THE INVENTION

A main object of the present invention is to provide a planetarium which reduces the amount of work required to prepare programs.

Another object of the present invention is to provide a planetarium which enables a commentator to deliver adequate explanations to spectators.

These and other objects of the present invention are achieved by providing a planetarium comprising:

memory device for storing a plurality of information to describe astronomical bodies and the like;

projector for projecting astronomical bodies and the like;

input means for entering data relating to the attitude of said projector;

controller for controlling the attitude of said projector in accordance with said data;

selection means for selecting suitable information from among the information stored in said memory device; and a display for displaying said information selected by said selection means.

These and other objects, advantages and features of the present invention will become apparent from the following description thereof taken in conjunction with the accompanying drawings which illustrate specific embodiments of the invention.

BRIEF DESCRIPTION OF THE DRAWINGS

FIG. 3 and FIG. 4 are flow charts showing the control in the auto script mode;

FIG. 7 is an elevation view showing an example of a display when in the navigation mode;

FIG. 8 is an elevation view showing another example of a display when in the navigation mode;

DETAILED DESCRIPTION OF THE PREFERRED EMBODIMENTS

Figure 1:
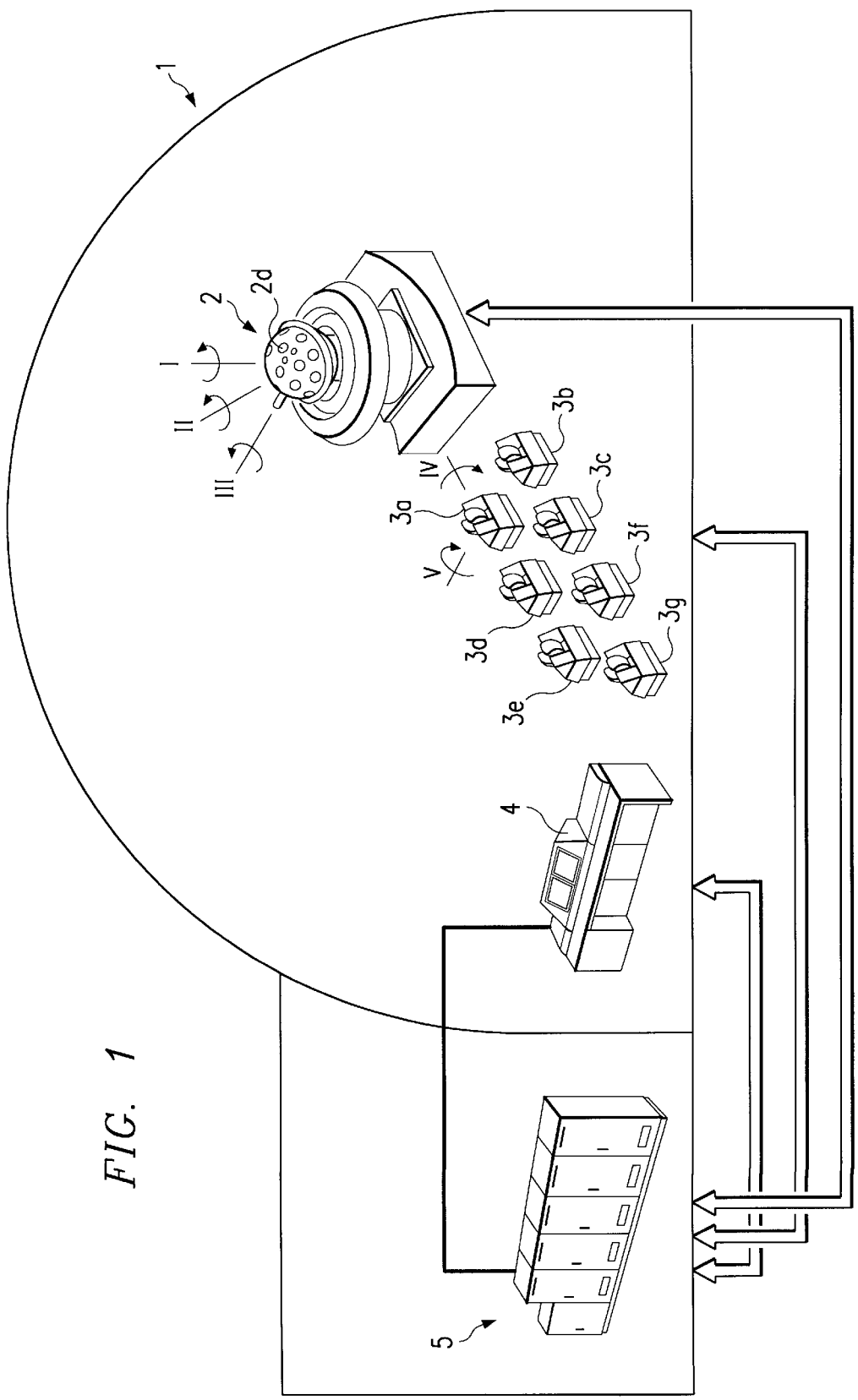
FIG. 1 is a perspective view showing an embodiment of the planetarium of the present invention.

The preferred embodiments of the present invention are described hereinafter with reference to the accompanying drawings. FIG. 1 shows the construction of a planetarium of the present invention. Within dome 1 are provided fixed star projection apparatus 2, planet projection apparatus 3a–3g and control unit 4 for specifying and monitoring the operation of said projection apparatus (or projectors). Fixed star projector 2a of fixed star projection apparatus 2 is rotatable about frame rotational axis I, diurnal rotational axis II, and latitude rotational axis III. The various projectors of planet projection apparatus 3a–3g are rotatable about axis IV, and axis V. The aforesaid devices are controlled by control apparatus 5.

Figure 2:
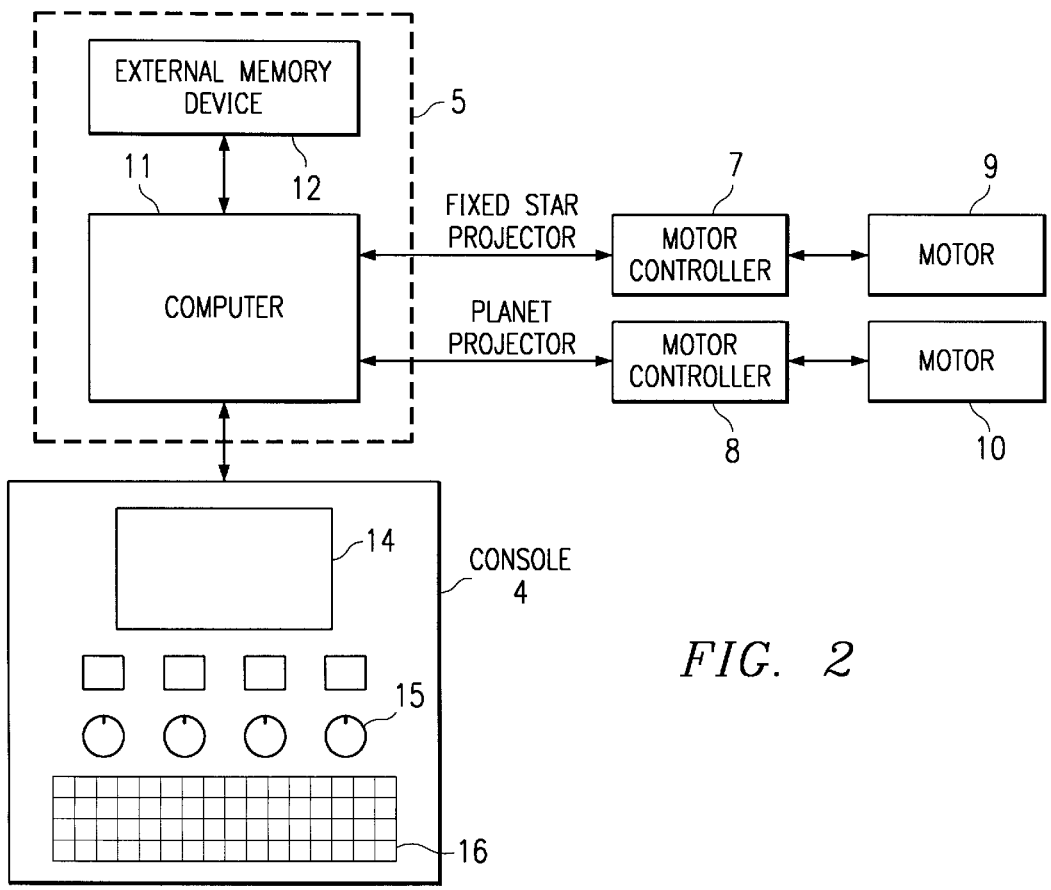
FIG. 2 is a block diagram showing the control circuit of the embodiment of the planetarium of the present invention.

FIG. 2 shows the control circuit of a planetarium of the present invention. Computer 11 and external memory device 12 comprise control apparatus 5. Projector motors 9 and 10 are connected to computer 11 via motor controllers 7 and 8, such that the attitudes of the various projectors are controlled by computer 11. Computer 11 is also connected to external memory device 12 and console 4. Console 4 is provided with CRT (cathode ray tube) display 14 having a touch panel, volume 15 for entering the amount of drive for the various motors, and keyboard 16. External memory device 12 stores a plurality of information relating to astronomical bodies such as the sun, moon, planets, constellations and the like.

Figure 4:
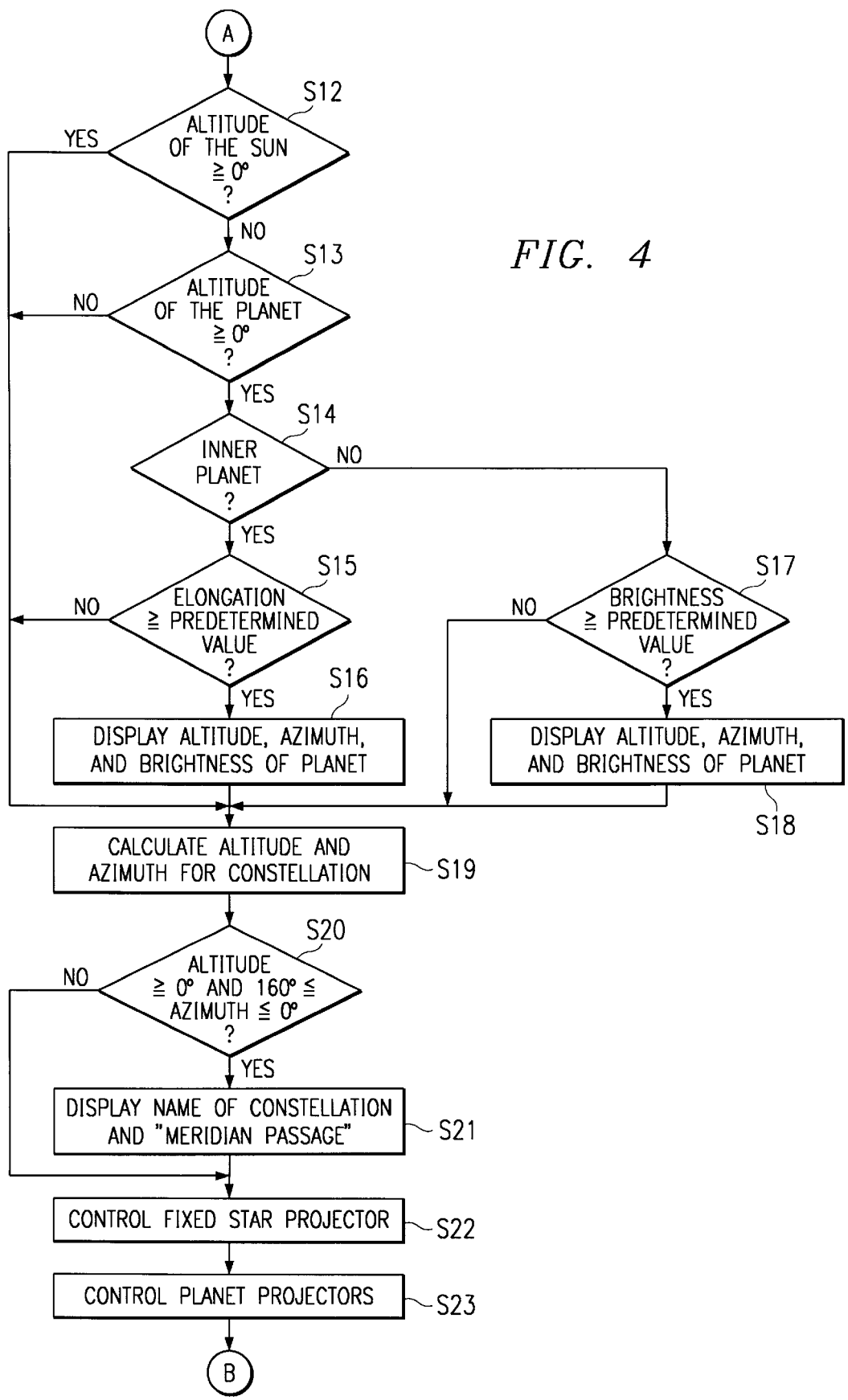

FIGS. 3, 4 show the control executed by computer 11. When the amount of change in time and location are entered from volume 15 of console 4, the time and location after the change is calculated (steps S1, S2). Then, the altitude and azimuth of the sun are calculated for the calculated time and location (step S3), and a different display incorporating the calculated altitude of the sun is displayed on display 14. That is, when the altitude of the Sun is 0° or greater, "day time" is displayed (step S5); when the altitude of the sun is −18° or greater but less than 0°, "astronomical twilight" is displayed (step S6); and when the altitude of the sun is less than −18°, night time is displayed (step S7). Then, processing for the moon is executed. The azimuth, altitude, and age of the moon are calculated for the time and location calculated in step S2 (step S8). If the altitude of the Moon is 0° or greater, the azimuth, altitude and age of the Moon are displayed on display 14 (step S10).

Then, processing for the various planets are executed (steps S11–S18). Although the processes of steps S11–118 in the drawings are only indicated in a general way, said steps S11–S18 are repeated for the various planets, i.e., from the processes relating to Mercury to those relating to Pluto. In step S11, the azimuth, altitude, and brightness are calculated for each planet at the time and location previously calculated in step S2. If the calculated altitude of the sun is less than 0° and the calculated altitude of the planet is 0° or greater (step S12: NO; step S13: YES), a determination is made as to whether or not the processed planets are inner planets (e.g., Mercury, Venus), or outer planets (step S14). When the processed planet is an inner planet, the elongation is determined for the planet at the current time; and if the elongation is equal to or greater than a predetermined value, the name of the planet, its azimuth, altitude, and brightness are displayed on display 14 (steps S15, S16). Conversely, when the elongation is less than the predetermined value, the aforesaid information is not displayed on display 14 because that planet is not visible. When the aforesaid planet is Venus, either the "morning star" Venus or "evening star" Venus is displayed on display 14. On the other hand, when the aforesaid planet is an outer planet, and its brightness calculated in step S11 is equal to or greater than a predetermined value, the name of the planet, its azimuth, altitude, and brightness are displayed on display 14 (steps S18).

Processing for constellations is executed thereafter (steps S19–S21). Although the processes of steps S19–S21 in the drawings are only indicated in a general way, said steps S19–S21 are executed sequentially for each constellation. The azimuth angle and altitude are calculated for the center position of the constellation at the time and location calculated in step S2 (step S19). The data relating to the center position of each constellation are stored in external memory device 12. When the altitude thus determined is 0° or greater and the azimuth angle is 160° or greater but less than 200°, the name of the constellation and "meridian passage" are displayed on display 14 (step S21). Following the aforesaid processing, data relating to the attitudes of fixed star projection apparatus 2 and planet projection apparatus 3a–3g are transmitted to motor controllers 7 and 8, such that said fixed star projection apparatus 2 and planet projection apparatus 3a–3g are actuated thereby (steps S22, S23).

In the embodiment described above, not only are the various projectors actuated when data relating to time and location are transmitted, but information (data relating to the position and the like of the sun, moon, planets, and constellations) is also displayed on display 14 to describe the star field projected on dome 1. Accordingly, a commentator can readily provide descriptions simply by reading the information displayed on display 14. In the present embodiment, the aforesaid type of operation is called the auto script mode.

Figure 5:
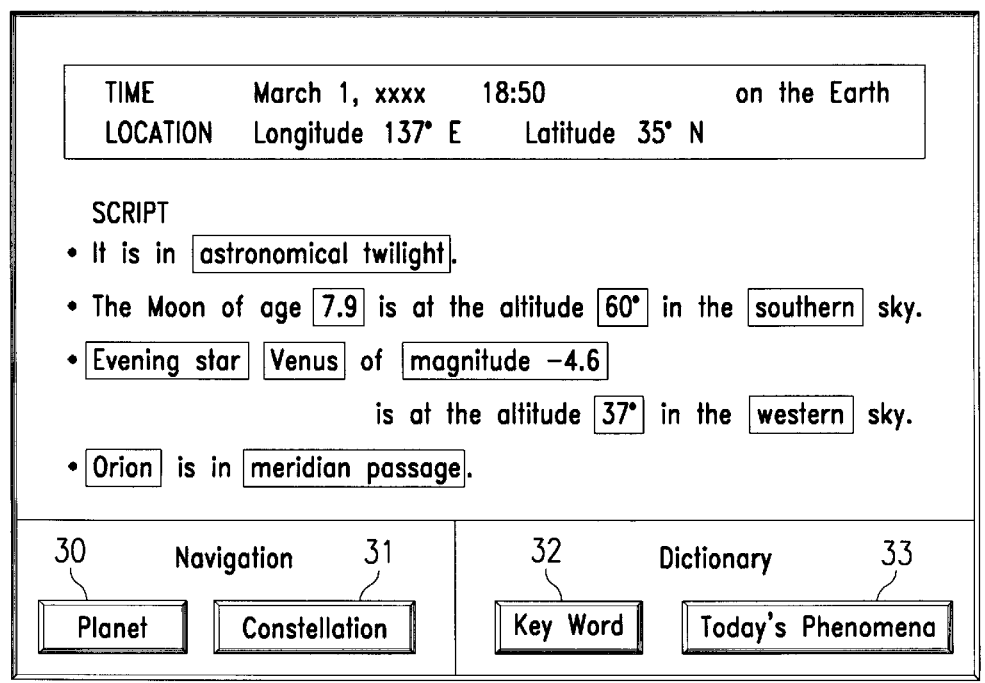
FIG. 5 is an elevation view showing an example of a display on the display.

FIG. 5 shows an example of a display shown in display 14 following the processing shown in FIGS. 3, 4. The display shown in display 14 at this time is divided into top, middle, and bottom sections. Data relating to time and location are displayed in the top section; information in text format is displayed in the middle section and is used to describe the sun, moon, planets, and constellations; touch switches 30–33 of a touch panel type are arranged in the bottom section of display 14. Touch switches 30 and 31 are used to specify the start of the navigation mode relating to the respective planets and constellations, and touch switches 32 and 33 are used to specify the start of the dictionary mode. The aforesaid navigation mode and dictionary mode will be described in detail later.

The information displayed on display 14 via the auto script mode is not limited to the information as previously described. For example, information displayed as numerical values in the previous example may be displayed in words, and the display may utilize graphs or graphics. The positions of planets and the like may be expressed as being "within the . . . constellation," and may be used to show illustrations of the ages of the moon. the aforesaid information may also be audio output.

Not only information relating to the current time, but also predictive information (e,g., when stars not appearing at the present time would appear) may be displayed on display 14.

Further, information not pertaining to the sun, moon, planets, and constellations may be displayed on display 14. For example, displays of information such as comets, nebulae, star clusters, and astronomical phenomena (variable stars, meteor stream, eclipse and the like) may be used.

Whether or not the information is displayed in the auto script mode may be selectable via a switch or the like.

Figure 6:
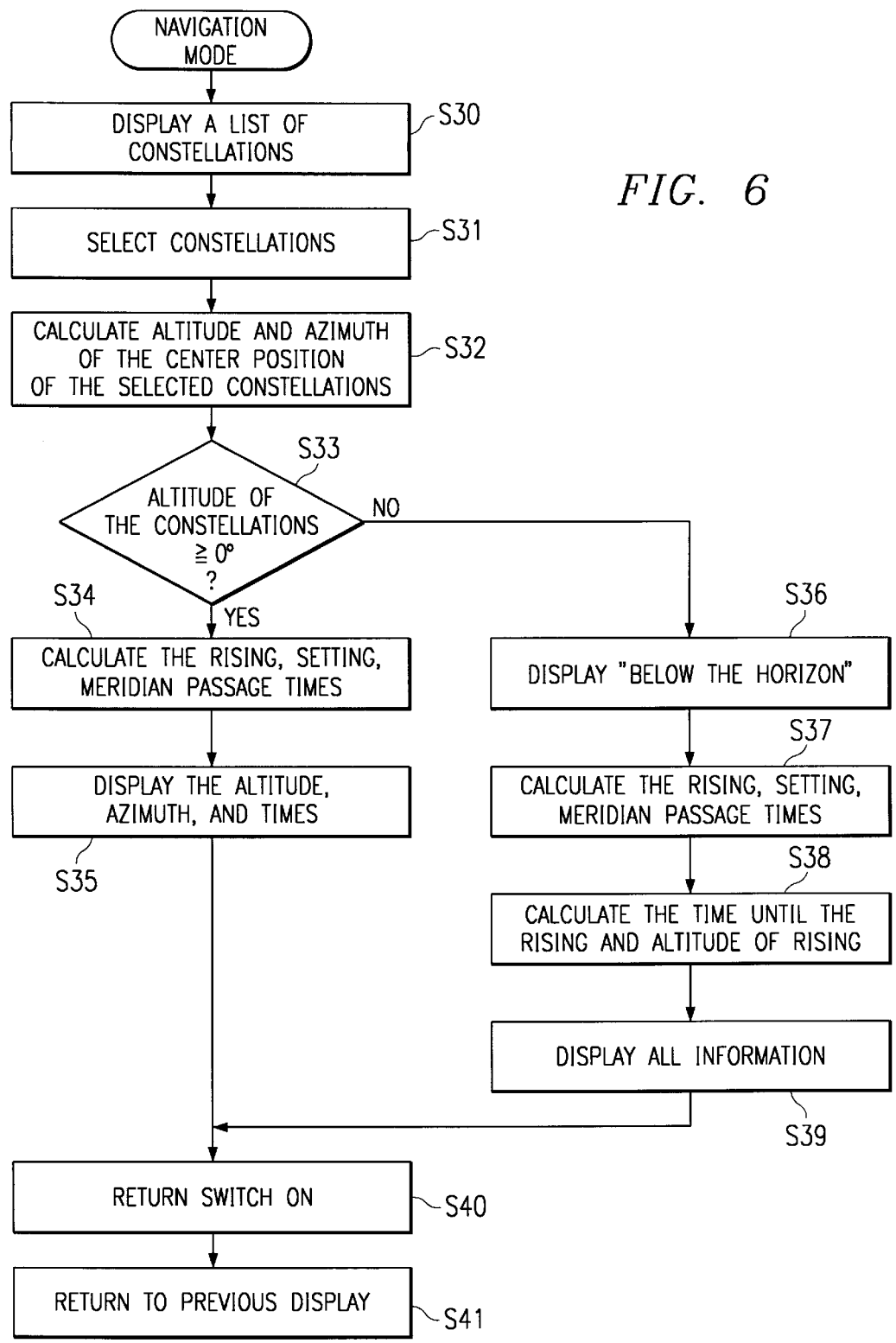
FIG. 6 is a flow chart showing the control in the navigation mode.

The navigation mode is described hereinafter. FIG. 6 shows the control for the navigation mode relating to constellations. The navigation mode for constellations is started by touching touch switch 31 (FIG. 5). When touch switch 31 is touched, the display of display 14 changes to the state shown in FIG. 7, and a list of constellations is shown on display 14 (step S30). Then, a single constellation is selected by touching on the display the name of the constellation for which detailed information is desired (step S31). After the azimuth angle and altitude of the center position of the selected constellation has been calculated (step S32), a determination is made as to whether or not the calculated altitude is 0° or greater (step S33). When the constellation altitude is 0° or greater, the rising, setting, and meridian passage times of the constellation are calculated, and are displayed on display 14 (step S34, S35). On the other hand, when the altitude of the constellation is less than 0°, an indicator that the constellation is below the horizon is displayed on display 14 (step S36). Then, the constellations rising, setting, and meridian passage times are calculated, and the time until the rising and altitude of rising of said constellation is calculated, and all such information is displayed on display 14 (steps S37–S39).

The display shown on display 14 is switched to the state shown in FIG. 8 via the previously described process. FIG. 8 is an illustration describing the display when Virgo has been selected in step S31. In addition to the contents and constellation names determined in steps S36–S38 of FIG. 6, constellation charts and the names of the first magnitude Star (for this example, Spica) are also shown on display 14. These constellation charts and names of first magnitude stars are stored beforehand in external memory device 12, so as to be called from said external memory device 12 in accordance with the constellation selected by an operator, and displayed on display 14. In addition to the information shown in the drawing, information regarding the mythology attending the subject constellation, as well as nebulae and star clusters related to said constellation may also be displayed.

The bottom section of display 14 in the state shown in FIG. 8 is provided with a "return" touch switch 35. When return touch switch 35 is touched, the display of display 14 is returned to the state shown in FIG. 7. When return touch switch 34 provided in the top section of display 14 in the state shown in FIG. 7 is touched, the display of said display 14 is returned to the state shown in FIG. 5 (steps S40, S41).

Even when the planetary navigation mode is selected, processing is similar to that described when the constellation navigation mode is selected. That is, the planetary navigation mode displays a list of planets rather than a list of constellations, describes details of said planets rather than details of the constellations shown in FIG. 8.

In the navigation mode, various additional information such as solar eclipse, lunar eclipse, variable stars, meteor stream and the like may be displayed on display 14.

When the navigation mode is executed, not only can information be displayed on display 14, but the various projectors may be driven so as to project the displayed astronomical information on dome 1. In such circumstances, the state of projectors 2 and 3a–3g may be automatically controlled, and such that the operation sequence of the projection apparatus 2 and 3a–3g may be displayed on display 14. For example, when "meteor stream" is selected in the navigation mode, the "Please switch on the meteor stream projector" display may be shown on display 14.

Furthermore, when a plurality of information desired for viewing during the performance is specified beforehand, said information specified before the projection performance may be sequentially displayed by touching a specific switch during projection.

Figure 9:
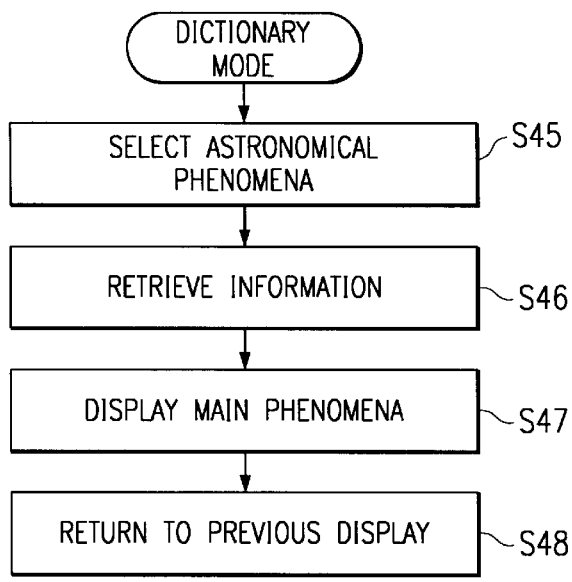
FIG. 9 is a flow chart showing the control in the dictionary mode.
Figure 10:
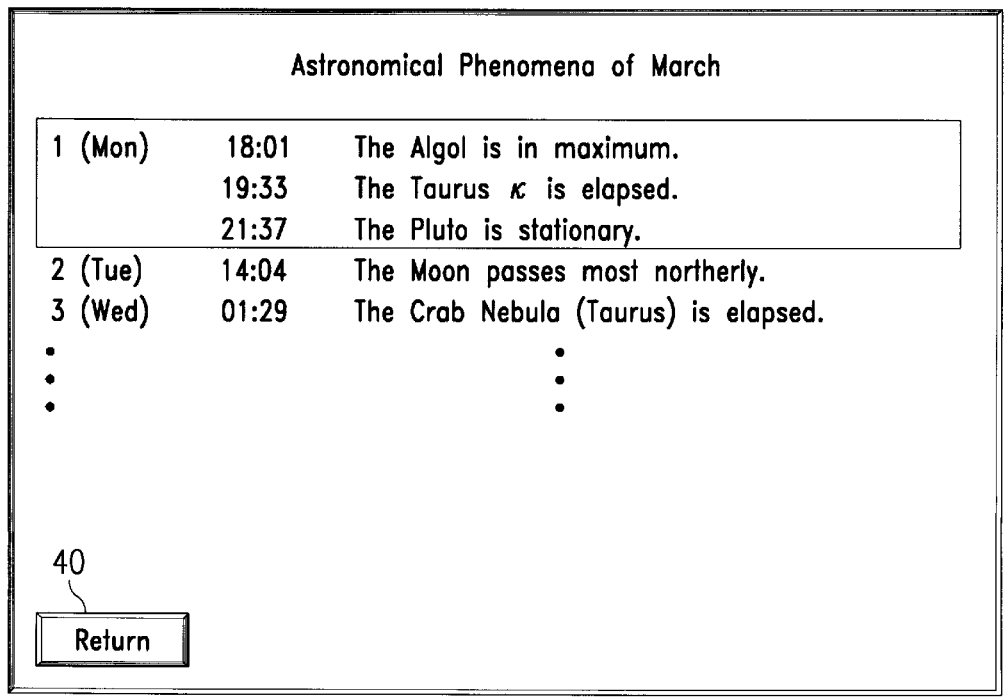
FIG. 10 is an elevation view showing an example of a display when in the dictionary mode.

The dictionary mode is described hereinafter with reference to FIGS. 9 and 10. The dictionary mode starts when key word touch switch 32 or today's astronomical phenomena touch switch 33 is touched on display 14 in the state described in FIGS. 5 or 8. FIG. 9 shows the control of the dictionary mode when today's astronomical phenomena touch switch 33 is touched. When touch switch 33 is touched (step S45), information relating to the main astronomical phenomena of that month and day previously set among the information stored in external memory device 12 is retrieved (step S46), and displayed on display 14 (step S47). FIG. 10 shows an example of the information retrieved in step S46 displayed on display 14 when the set date is March 1. As shown in the drawing, the main astronomical phenomena of March are displayed in a list on display 14, and the astronomical phenomena for that day (March 1) are displayed highlighted in a halftone.

When return touch switch 40 provided in the bottom section of display 14 shown in FIG. 10 is touched, the dictionary mode ends, and display 14 returns to the state prior to the execution of the dictionary mode. In the states of display 14 shown in FIGS. 5 and 8, the dictionary mode starts when key word touch switch 32 is touched. In this circumstance, key words entered by an operator via keyboard 16 cause a description to be displayed on display 14. For example, when "black hole" is entered via keyboard 16, information related to black holes is retrieved from among descriptions stored in external memory device 12, and displayed on display 14.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A control system for a planetarium, said planetarium having a dome and at least one projector for projecting representations of astronomical bodies on said dome for viewing by an audience, said control system comprising:

an input unit for entry of first information;

a controller, coupled to the input unit, to (i) direct the at least one projector in accordance with said first information and (ii) generate second information responsive to said first information; and a commentator display, coupled to the controller, to receive and display said second information for conveyance by a commentator to said audience.

2. A system as claimed in claim 1, wherein the first information includes time and location data and said controller calculates new time and location data based upon said first information.

3. A system as claimed in claim 2, wherein said controller calculates an altitude value for selected astronomical bodies based upon said new time and location data, and wherein said second information includes said altitude value.

4. A system as claimed in claim 3, wherein one selected astronomical body is the sun and, responsive to said altitude value, said controller determines a time of day designation, and wherein said second information includes said time of day designation.

5. A system as claimed in claim 4, wherein said controller maintains a name for, and further calculates an azimuth and brightness value for, one or more inner planets provided the respective altitude value of said one or more inner planets is equal to or greater than a first predetermined value, an elongation value of said one or more inner planets is equal to or greater than a second predetermined value and the altitude value of the sun is less than 0°, and wherein said second information includes said names and said azimuth and brightness values.

6. A system as claimed in claim 4, wherein said controller maintains a name for, and further calculates an azimuth and brightness value for, one or more outer planets provided the respective altitude value of said one or more outer planets is equal to or greater than a first predetermined value, the brightness value of said one or more outer planets is equal to or greater than a second predetermined value and the altitude value of the sun is less than 0°, and wherein said second information includes said names and said azimuth and brightness values.

7. A system as claimed in claim 3, wherein said controller further calculates an azimuth and age value for said selected astronomical bodies based upon said new time and location data, and wherein said second information includes said azimuth and age values.

8. A system as claimed in claim 7, wherein one selected astronomical body is the moon.

9. A system as claimed in claim 2, wherein controller further calculates an azimuth angle value for a center position of one or more constellations based upon said new time and location data, and wherein said second information includes said azimuth angle value.

10. A control system for a planetarium, said planetarium having a dome and at least one projector for projecting representations of astronomical bodies on said dome for viewing by an audience, said control system comprising:

a memory device containing predefined instructional information about astronomical bodies;

an input unit for entry of first information and selection of certain instructional information;

a controller, coupled to the input unit, to (i) direct the at least one projector in accordance with said first information; (ii) generate second information responsive to said first information; and (iii) retrieve said certain instructional information from said memory device and;

a commentator display, coupled to the controller, to receive and display said second information and said certain instructional information for indirect communication to said audience.

11. A system as claimed in claim 10, wherein the first information includes time and location data and said controller calculates new time and location data based upon said first information.

12. A system as claimed in claim 11, wherein said controller further calculates rising, setting and meridian passage time values for said astronomical bodies responsive to said selected certain instructional information and based upon said new time and location data, and wherein said second information includes said rising, setting and meridian passage time values.

13. A system as claimed in claim 11, wherein said controller calculates an altitude value for selected astronomical bodies based upon said new time and location data, and wherein said second information includes said altitude value.

14. A system as claimed in claim 13, wherein one selected astronomical body is the sun and, responsive to said altitude value, said controller determines a time of day designation, and wherein said second information includes said time of day designation.

15. A system as claimed in claim 14, wherein said controller maintains a name for, and further calculates an azimuth and brightness value for, one or more inner planets provided the respective altitude value of said one or more inner planets is equal to or greater than a first predetermined value, an elongation value of said one or more inner planets is equal to or greater than a second predetermined value and the altitude value of the sun is less than 0°, and wherein said second information includes said names and said azimuth and brightness values.

16. A system as claimed in claim 14, wherein said controller maintains a name for, and further calculates an azimuth and brightness value for, one or more outer planets provided the respective altitude of said one or more outer planets is equal to or greater than a first predetermined value, the brightness value of said one or more outer planets is equal to or greater than a second predetermined value and the altitude value of the sun is less than 0°, and wherein said second information includes said names and said azimuth and brightness values.

17. A system as claimed in claim 13, wherein said controller further calculates an azimuth and age value for said selected astronomical bodies based upon said new time and location data, and wherein said second information includes said azimuth and age values.

18. A system as claimed in claim 17, wherein one selected astronomical body is the moon.

19. A system as claimed in claim 13, wherein controller further calculates an azimuth angle value for a center position of one or more constellations based upon said new time and location data, and wherein said second information includes said azimuth angle value.

20. A method for controlling a planetarium presentation to an audience, comprising the steps of:

entering first information into a control system input unit;

selecting certain predefined instructional information about astronomical bodies from a control system memory device;

generating second information responsive to said first information;

projecting representations of astronomical bodies in accordance with said first information for viewing by said audience;

displaying said second information and said predefined instructional information on a commentator display; and communicating said second information and said predefined instructional information to said audience.

* * * * *

UNITED STATES PATENT AND TRADEMARK OFFICE
CERTIFICATE OF CORRECTION

PATENT NO.    : 6,033,230
DATED         : March 7, 2000
INVENTOR(S)   : Nozomu Shiotsu It is certified that error appears in the above-identified patent and that said Letters Patent is hereby corrected as shown below:

<u>Column 6,</u>
Line 43, (claim 9, line 1), delete "claim 2", and insert -- claim 3 --.

Signed and Sealed this

Ninth Day of October, 2001

Attest:

NICHOLAS P. GODICI
*Attesting Officer*    *Acting Director of the United States Patent and Trademark Office*